United States Patent [19]

Takeda et al.

[11] Patent Number: 4,644,109
[45] Date of Patent: Feb. 17, 1987

[54] ALARM INFORMATION TRANSMISSION SYSTEM FOR COIN TELEPHONE

[75] Inventors: Yoshiaki Takeda; Toshiharu Kinoshita, both of Kanagawa; Osamu Kai, Tokyo, all of Japan

[73] Assignee: Tamura Electric Works, Ltd., Tokyo, Japan

[21] Appl. No.: 785,346

[22] Filed: Oct. 7, 1985

[30] Foreign Application Priority Data

Oct. 12, 1984 [JP] Japan .................... 59-212653

[51] Int. Cl.[4] .................................. H04M 1/24
[52] U.S. Cl. .............................. 379/27; 379/32; 379/143
[58] Field of Search .......... 179/175.2 D, 175.2 A, 179/175.2 B, 175.2 C, 175.2 R, 6.3 R, 175, 175.3 R

[56] References Cited

U.S. PATENT DOCUMENTS 4,039,768  8/1977  O'Maley .................. 179/175.2 C
4,582,965  4/1986  Lembke .................. 179/175.3 R

FOREIGN PATENT DOCUMENTS 2088171B  10/1984  United Kingdom .

OTHER PUBLICATIONS

Japanese Patent Laid Open Specification No. Sho 58-156259.
European Patent Publication No. 0012102, Jul. 18, 1984.
Japanese Patent Laid Open Specification No. Sho 58-157249.

Primary Examiner—Stafford D. Schreyer
Attorney, Agent, or Firm—Blakely, Sokoloff, Taylor & Zafman

[57] ABSTRACT

In a coin telephone, a self diagnosis function and an alarm information transmission function upon formation of a loop in an off-hook mode are utilized. Upon reception of a ringing signal from a maintenance control center, self diagnosis is performed. Upon detection of a failure, a content of the failure and a control number of the coin telephone are sent to the maintenance control center. A failure check for a coin telephone which is not frequently used can be performed from the telephone center without requiring an off-hook operation.

10 Claims, 10 Drawing Figures

ALARM INFORMATION TRANSMISSION SYSTEM FOR COIN TELEPHONE

BACKGROUND OF THE INVENTION

The present invention relates to an alarm information transmission system for coin telephone and, more particularly, to an alarm information transmission system with a self diagnosis function.

Coin telephone systems with a self diagnosis function have been known. It is also known to transmit alarm information from such a conventional coin telephone to a control side in accordance with diagnosis result.

A self diagnosis function of a coin telephone (to be referred to as a telephone set hereinafter) is disclosed in detail in European Patent Publication No. 0012102 (July 18, 1984). An alarm information transmission system of the telephone set is disclosed in Japanese Patent Disclosure No. 58-156259. These prior art systems are operated to perform self diagnosis or transmit alarm information upon formation of a DC loop upon off-hook operation by a user.

Since coin telephone sets at rural areas are not often used, failure detection of the sets is delayed in such areas. Furthermore, when a consignee judges that the telephone set is broken and attaches a note "Out of Order" to the telephone set, the telephone set will not be hooked off. Unless a failure message is received by maintenance personnel through another telephone line, the maintenance control center cannot know the failure. The broken telephone set may then be left unrepaired, and the maintenance control center cannot provide best service to the users.

SUMMARY OF THE INVENTION

It is, therefore, an object of the present invention to provide an alarm information transmission system for a coin telephone, wherein automatic self diagnosis of the coin telephone and alarm information transmission can be performed whenever alarm information acquisition is required by a control side.

It is another object of the present invention to provide an alarm information transmission system for a coin telephone, wherein self diagnosis operation of the coin telephone and alarm information transmission can be automatically designated from the control side irrespective of off-hook operation of the coin telephone.

In order to achieve the above object of the present invention, the system of the present invention has the following arrangement.

When a control side calls a coin telephone through an exchange, the coin telephone detects the ringing signal from the exchange, and a DC loop is automatically formed to perform a self diagnosis. When a failure is detected by the self diagnosis, the alarm information corresponding to the content of the failure and the control number of the coin telephone are transmitted by corresponding means in a predetermined signal form to a station line.

According to the alarm information system of the present invention, when the ringing signal is sent from the control side to the telephone set upon operation of the control side, the telephone set automatically starts self diagnosis. When a failure is detected in the self diagnosis, the content and control number of the telephone set are transmitted to the control side, so that the maintenance control center can know the content of the failure and the control number of the telephone set.

DESCRIPTION OF THE PREFERRED EMBODIMENT

Figure 1:
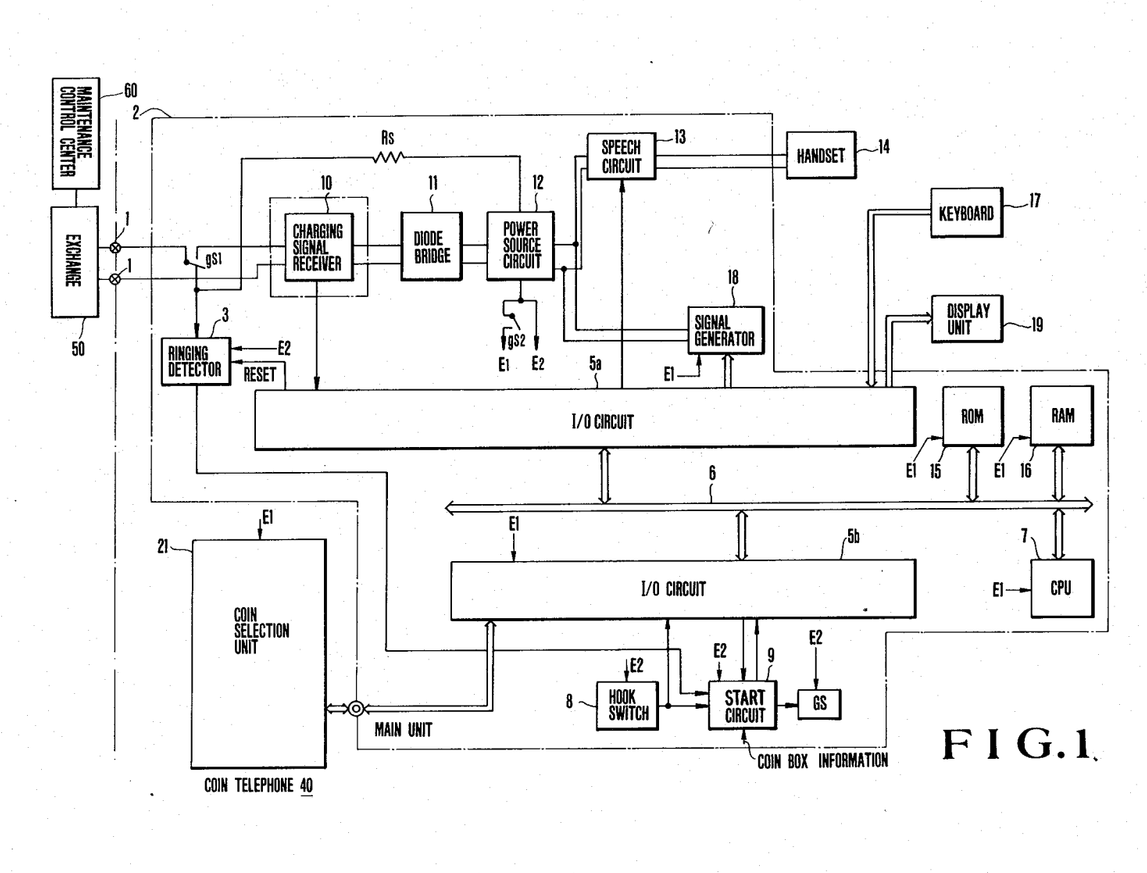
FIG. 1 is a block diagram of a telephone set according to an embodiment of the present invention.

FIG. 1 is a block diagram showing the overall configuration of a telephone set according to an embodiment of the present invention. Station line terminals 1 connect a coin telephone 40 to an exchange 50. The terminals 1 are normally connected to a ringing detector 3 through a contact gs1 of a relay GS arranged in a main unit 2 in the coin telephone 40.

The ringing detector 3 is also connected to the relay GS through a start circuit 9 and to a central processing unit (CPU) 7 such as a microprocessor through an I/O circuit 5a. The terminals 1 are connected to a charging signal receiver 10 through the contact gs1 which is normally cut off. The receiver 10 is connected to a diode bridge 11 and a power source circuit 12. The receiver 10 is further connected to a handset 14 through a speech circuit 13. The output terminal of the power source circuit 12 is connected to a signal generator 18.

A current having a magnitude which does not operate the exchange always flows from the break side of the contact gs1 to the power source circuit 12 through a high-resistance resistor Rs upon on-hook operation. In this state, a contact gs2 is opened, so that only a local power source voltage E2 is supplied to circuits (i.e., the ringing detector 3, a hook switch 8, the start circuit 9 and the relay GS) requiring the voltage supply during the on-hook operation.

When the start circuit 9 is operated to energize the relay GS (to be described later), the contact gs2 is closed and a current flowing through the DC loop is rectified by a diode bridge 11. Thereafter, the power source circuit 12 supplies a bias voltage as a local power source voltage E1 to the signal generator 18, the I/O circuits 5a and 5b, the CPU 7, a read-only memory (ROM) 15, a temporary memory (RAM) 16 and a coin selection unit 21 through the contact gs2. The power source circuit is known as described in British Patent No. 2008817. Reference numeral 17 in FIG. 1 denotes a keyboard; and 19, a display unit. It should be noted that the I/O circuits 5a and 5b, a bus 6, the CPU 7, the RAM 16 and the ROM 15 constitute a known microcomputer.

When a ringing signal is transmitted from the exchange 50 to the coin telephone 40 in accordance with interrogation from a maintenance control center 60, the ringing signal is supplied to the ringing detector 3 through the terminals 1 and the contact gs1. The ringing detector 3 drives the start circuit 9 which then energizes the relay GS. The contact gs1 is switched to disconnect the ringing detector 3 from the terminals 1. The terminals 1 are coupled to the speech circuit 13 and the handset 14 through the charging signal receiver 10 and the diode bridge 11. As a result, a known DC loop is formed between the terminals 1 and the speech circuit 13 or the handset 14. Upon formation of the DC loop, the contact gs2 is closed as described above, so that the local power source voltage E1 is supplied to the CPU 7 and other major components. The CPU 7 accesses the ROM 15 to start self diagnosis operation. This self diagnosis operation performed upon reception of an incoming call is a characteristic feature of the present invention. When a self diagnosis result is sent back to the maintenance control center 60 in a manner to be described later, the CPU 7 causes the coin telephone to disengage from the station lines. It should be noted that the relay GS is kept energized until the CPU 7 performs the disengagement operation, and the relay GS is reset by a signal from the CPU 7 through the start circuit 9.

The coin telephone also has a self diagnosis function even in the case of an outgoing call in the same manner as in European Patent Publication No. 0012102. More particularly, when the hook switch 8 generates an off-hook signal upon off-hook operation, the start circuit 9 is started to drive the relay GS. At the same time, the start signal is supplied to the CPU 7 through the input-/output circuit 5b and the bus 6. The CPU 7 performs the call control operation including self diagnosis in response to the start signal. The contact gs1 is operated to connect the speech circuit 13 to the line terminals 1 through the charging signal receiver 10, the diode bridge 11 and the power source circuit 12. A DC loop is formed for the transmission line, and thus a called party can talk with a calling party at the handset 14.

Upon on-hook operation, the CPU 7 deenergizes the relay GS through the start circuit 9, and the coin telephone is set in the standby mode.

When the local power source voltage E1 is supplied to the CPU 7, the CPU 7 executes a speech processing program stored in the ROM 15 connected thereto through the bus 6. The CPU 7 accesses data with respect to the RAM 16. In this manner, the CPU 7 performs and controls self diagnosis in response to formation of a closed DC loop.

When no failure is detected by self diagnosis for an outgoing call, a dial signal of a composite audible frequency (to be referred to as an MF) is sent from the signal generator 18 upon operation at the keyboard 17, a telephone charge is displayed by the display unit 19, and the coin selection unit 21 performs coin collection in accordance with charging information supplied from the charging signal receiver 10 in response to a charging signal from an exchange under the control of the CPU 7. When the dial signal is sent out, the CPU 7 allows a free outgoing call in response to data stored in the ROM 15 and inhibits an outgoing call of an inhibition number. When coins inserted in a coin slot turret are running out, the telephone set is subjected to a forced release.

In the case of an incoming call upon ringing from the maintenance control center 60, however, an incoming trigger signal is supplied from the ringing detector 3 to the start circuit 9. A DC loop is automatically formed in response to the operation (i.e., make side) of the contact gs1 so as to forcibly drive the relay GS upon application of the power source voltage E2. The CPU 7 is started in response to energization of the relay GS. The CPU 7 performs self diagnosis. When the CPU 7 detects a failure, the content of the failure and alarm information which are stored in the ROM 15 are supplied as the MF signal to the office line through the line terminals 1.

Figures 2, 9:
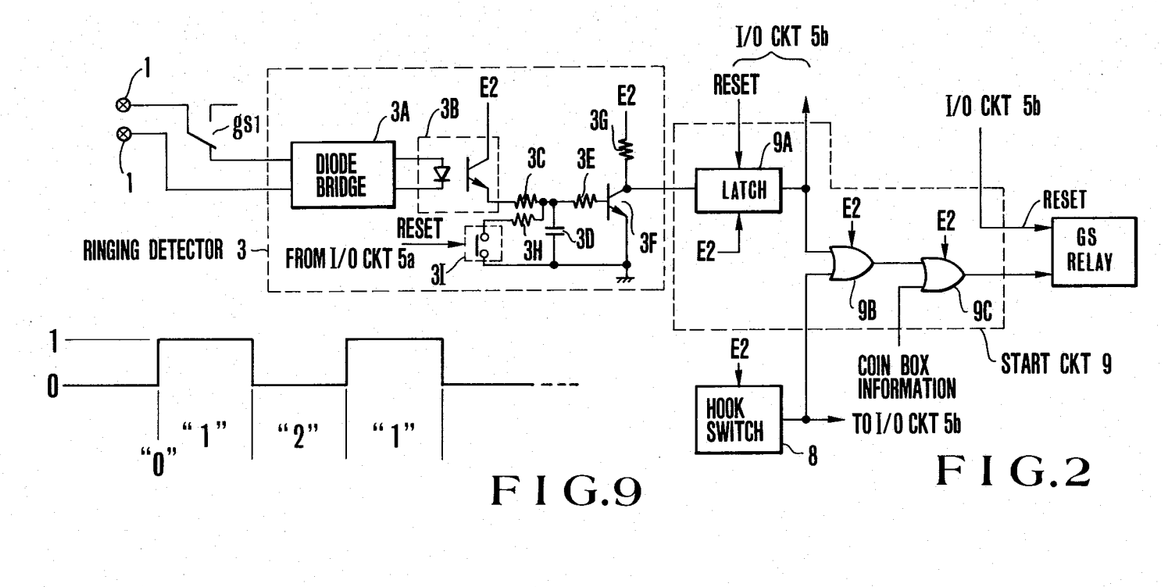
FIG. 2 is a circuit diagram of a ringing detector and a start circuit shown in FIG. 1.
FIG. 9 is a timing chart of a dial signal.

FIG. 2 is a circuit diagram of the ringing detector 3 and the start circuit 9 shown in FIG. 1. Referring to FIG. 2, the ringing detector 3 includes a diode bridge 3A connected to the station line terminals 1 through the contact gs1, a photocoupler 3B for receiving an output from the diode bridge 3A, a capacitor 3D for holding the ringing state upon reception of the output from the photocoupler 3B through a resistor 3C, and a transistor 3F which is turned on/off upon reception of the output from the capacitor 3D through a resistor 3E. Reference numeral 3G denotes a load resistor for the transistor 3F. When the ringing detector 3 receives the ringing signal supplied from the maintenance control center 60 through the exchange 50 via the contact gs1, the ringing signal is rectified by the diode bridge 3A, and a rectified signal is stored by the capacitor 3D through the photocoupler 3B. The output from the capacitor 3D is supplied to the start circuit 9 through the transistor 3F. It should be noted that the local power source voltage E2 is supplied to the photocoupler 3B and the transistor 3F. The capacitor 3D is connected in parallel with a series circuit of a resistor 3H and a switch 3I. The switch 3I serves to discharge the capacitor 3D in response to the reset signal from the I/O circuit 5a. The switch 3I is turned on, for example, in step 131 of FIG. 3 to be described later.

The start circuit 9 includes a latch 9A for receiving the output from the transistor 3F in the ringing detector 3, an OR gate 9B for receiving the output from the latch 9A and the output from the hook switch 8, and an OR gate 9C for receiving the output from the OR gate 9B and a signal for checking normal insertion of coins in a coin box (not shown), e.g., coin box information signal representing that the coin box is filled with coins. In the start circuit 9, the signal from the transistor 3F in the ringing detector 3 is received by the latch 9A. The output from the latch 9A is supplied to the relay GS through the OR gates 9B and 9C, thereby energizing the relay GS and hence switching the contact gs1 to the make position and the contact gs2 to the closed position. The local power source voltage E1 is supplied to the respective components including the CPU 7. At the same time, the output from the latch 9A is supplied to the I/O circuit 5b, and the CPU 7 uses this signal as one of the self diagnosis processing data. The latch 9A is reset in response to the signal supplied through the I/O circuit 5b upon disengagement of the telephone set from the station lines. The latch 9A and the OR gates 9A and 9B receive the local power source voltage E2. The relay GS is deenergized in response to the reset signal supplied from the I/O circuit 5b to the start circuit 9.

Figure 3:
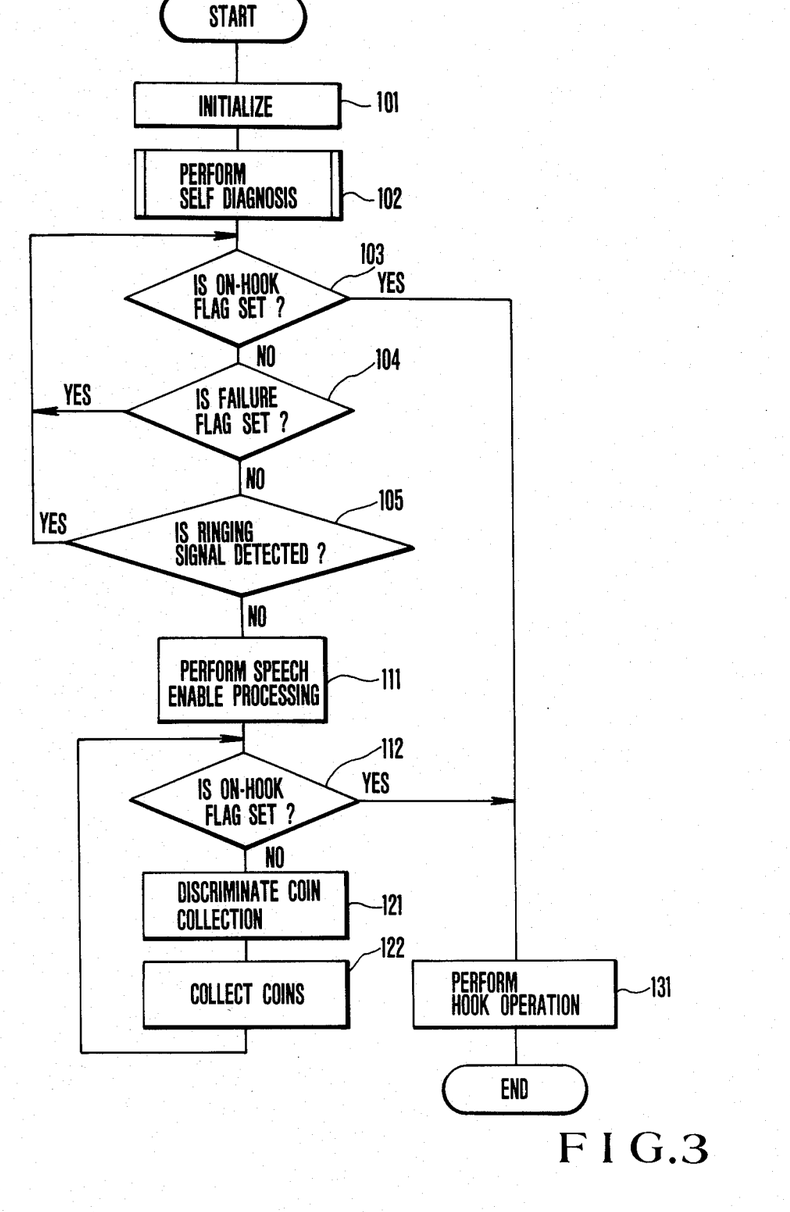
FIGS. 3 to 8 are flow charts for explaining the control operations of a CPU, respectively.

FIG. 3 is a general flow chart for explaining the control operation of the CPU 7. When the CPU 7 is energized with the local power source voltage E1, the CPU 7 accesses the ROM 15 to start the control sequence shown in FIG. 3. The CPU 7 performs "initialization processing" in step 101. The initialization processing includes initialization of the RAM 16 and resetting of the I/O circuits 5a and 5b. In step 102, the CPU 7 performs "self diagnosis processing" for a plurality of predetermined test locations and flag "1" or "0" is stored at a predetermined address of the RAM 16.

The CPU 7 then checks in step 103 whether or not an on-hook flag is set. If NO in step 103, the CPU 7 checks in step 104 whether or not a failure flag is set. If NO in step 104, the CPU 7 checks in step 105 whether or not an incoming call is made. The on-hook flag is checked by presence/absence of the signal supplied from the start circuit 9 to the I/O circuit 5b upon reception of an incoming call. When the ringing detector 3 supplies the ringing detection signal to the CPU 7, i.e., if NO in steps 104 and 105, the CPU 7 performs "speech enable processing" in step 111. However, if YES in step 104, the flow returns to step 103. If YES in step 105, the flow also returns to step 103.

Figure 4:
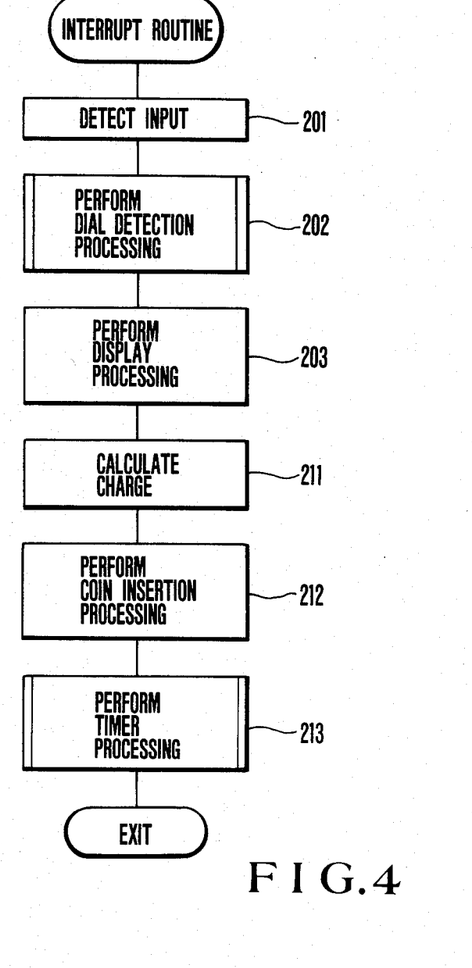

The above-mentioned steps 103 to 105 are associated with a failure detection loop upon reception of a call associated with the interrupt processing of FIG. 4.

The failure detection loop is repeated until no ringing signal is detected in step 105 or the on-hook flag is detected in step 103. Therefore, in the incoming mode, the flow does not advance to steps after step 111.

If YES in step 103, the flow advances to step 131 wherein hook operation is performed, so that the signal for deenergizing the relay GS is supplied to the relay GS through the I/O circuit 5b and the start circuit 9. The CPU 7 completes control and is set in the standby mode.

If NO in step 105, the flow advances to step 111 wherein speech processing at the time of disconnection of the speech circuit 13 upon dialing is performed. The flow advances to step 112, and the CPU 7 checks the presence/absence of the on-hook flag. If NO in step 112, coin collection decision processing is performed in step 121 to determine which coin is to be collected. Thereafter, coin processing is performed in step 122, and the flow returns to step 112.

Steps 121 and 122 are repeated until the on-hook flag is detected in step 112. The loop operation of steps 121 and 122 is the outgoing call processing routine. In step 112, when the on-hook flag is detected, the flow advances to step 131, and hook processing is executed. The CPU 7 resets the relay GS and completes the control operation. As a result, the CPU 7 is set in the standby mode.

FIG. 4 is a flow chart of an interrupt routine which is repeated together with the routine of FIG. 3 by the CPU 7 for every 4-msec cycle. The CPU 7 performs "input detection processing" in step 201 to fetch all signals from the hook switch 8, the unit 21, the charging signal receiver 10 and the keyboard 17. When the on-hook mode is detected, the on-hook flag is set in correspondence with the operations in step 112. The CPU 7 then performs "dial detection processing" in step 202 to be described later. The CPU 7 performs "display processing" in step 203 to drive the display unit 19 such that a remaining amount of coins inserted in the coin slot turret is displayed. Subsequently, "charging calculation processing" in step 211 is performed to subtract the charged amount from the total amount of coins in response to the charging signal. The CPU 7 performs "coin insertion processing" in step 212 to select inserted coins, discriminate denominations and accumulate an amount of nonused coins. The CPU 7 then performs "timer processing" in step 213 to monitor the energization period of a collecting magnet (not shown) in the unit 21, the time for local call and the control timings of the respective components. The CPU 7 thus controls the components in accordance with the corresponding control timings.

Figure 5:
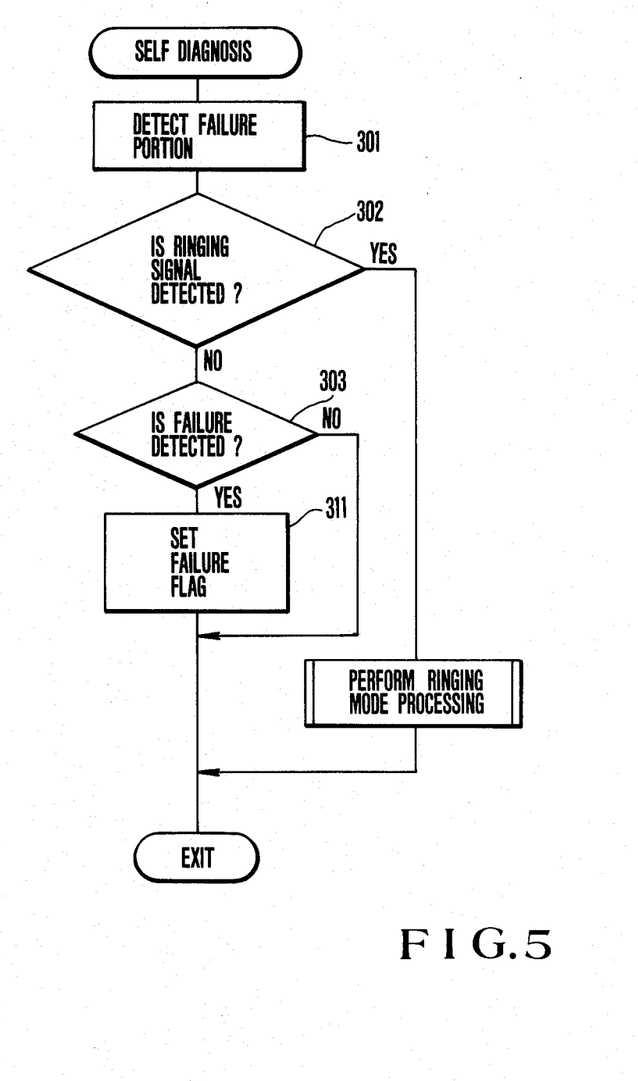

FIG. 5 is a flow chart of a subroutine showing the detailed operation of step 102 in FIG. 3. The CPU 7 performs "failure portion detection" in step 301 so as to determine whether or not the initial states of the components are predetermined states, respectively. The CPU 7 then checks in step 302 in the same manner as step 105 whether or not an incoming call is made. If NO in step 302, the CPU 7 checks in step 303 whether or not a failure is detected. When any failure is detected in step 301, step 303 is determined to be YES. The CPU 7 sets the failure flag in step 311 in the same manner as in step 104 of FIG. 3. The failure flag is set in a predetermined memory area in the RAM 1.

However, if YES in step 302, the CPU 7 performs "ringing mode processing" in step 312.

Figure 6:
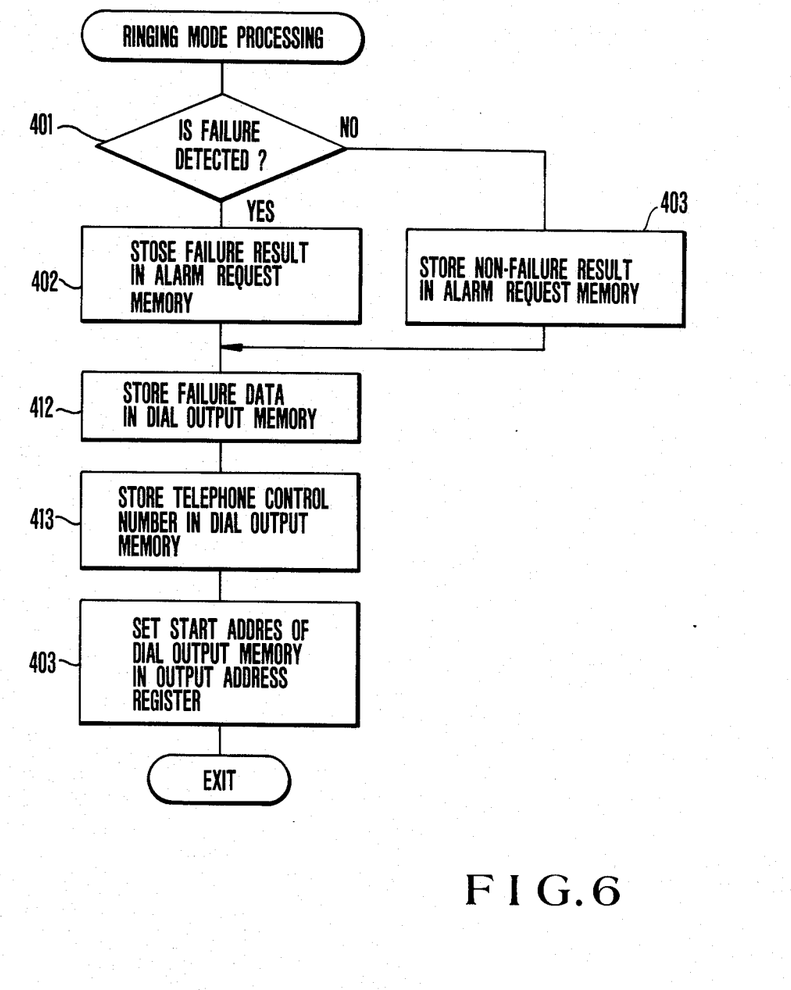

FIG. 6 is a flow chart showing a subroutine of step 312 of FIG. 5. When the CPU 7 determines in step 401 that the failure has occurred in response to the operation in step 301, the CPU 7 performs "storage of failure result in alarm request memory" as a part of the RAM 16 in step 402 after a sensor output is decoded. However, if NO in step 401, the CPU 7 performs "storage of non-failure result in alarm request memory" in step 403. Thereafter, the CPU 7 performs "failure data storage in dial output memory" as a part of the RAM 16 in step 411 and "telephone control number storage in dial output memory" in step 412. The CPU 7 then performs "start address setting of the dial output memory in a dial output register" in step 413.

In steps 411 and 412, the address data and control numbers are stored in the dial output memory. It should be noted that the control number is assigned to each coin telephone, so that data stored in the ROM 15 at address numbers N8 to N12 represents each control number assigned to a given telephone set. It should also be noted that data "*" at address numbers N0 and N1 represents a data start signal as a combination, that data "##" at the address numbers N13 and N14 represents a data end signal as a combination, and that data "#" at each of the address numbers N4 and N7 represents a space signal. The data at the address numbers n2 and N3 as a combination represents one failure portion number. At the same time, the data at the address numbers N5 and N6 as a combination represents one failure portion number. The data at the address numbers N15 and N16 represent initial states, respectively. The failure portion number is read out in accordance with the content of the failure and is decoded. The dial output memory for storing the data in the above-mentioned table outputs a signal corresponding to the dial number for making an outgoing call at the corresponding coin telephone. Dialing at the coin telephone and failure data transmission in automatic self diagnosis upon interrogation from the center can be performed in accordance with single software. In other words, since dialing and failure data transmission are performed using a single dial output memory, the failure data is temporarily stored in the alarm request memory and is then transferred to the dial output memory.

| Address No. | Data |
| --- | --- |
| N0 | * |
| N1 | * |
| N2 | Failure portion number (lower digit) |
| N3 | Failure portion number (upper digit) |
| N4 | # |
| N5 | Failure portion number (lower digit) |
| N6 | Failure portion number (upper digit) |
| N7 | # |
| N8 | Control number (first digit) |
| N9 | Control number (second digit) |
| N10 | Control number (third digit) |
| N11 | Control number (fourth digit) |
| N12 | Control number (fifth digit) |
| N13 | # |
| N14 | # |
| N15 | 1F |
| N16 | 1F |

Figure 7:
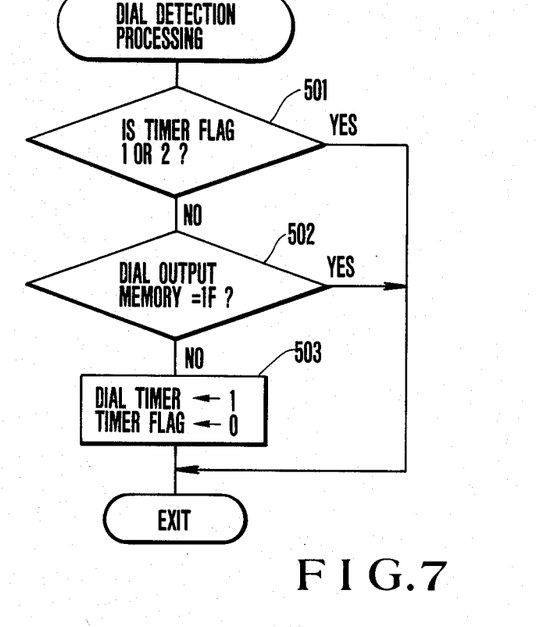
Figure 8:
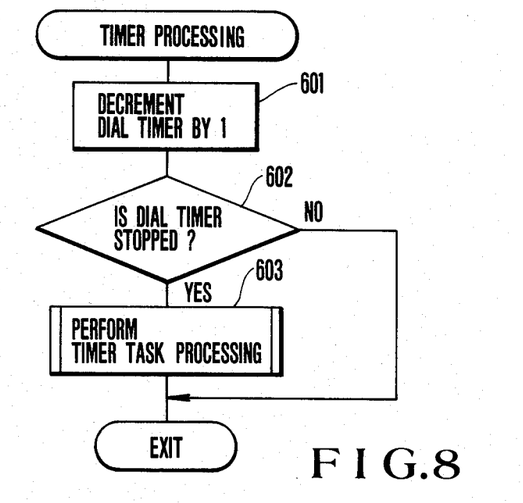

FIGS. 7 and 8 are flow charts showing the subroutines of steps 202 and 213 of FIG. 4, respectively. First, the steps in FIG. 7 will be described. A timer flag for storing the current status of the dial signal generated upon dialing is set in the RAM 16. This flag has a ternary state represented by values "0", "1" and "2". For example, as shown in FIG. 9, at the first leading edge of the dial signal, the flag is set at value "0". Thereafter, while the dial signal is then held at "1" level for a predetermined period of time (e.g., 160 ms), the flag is updated to value "1". While the dial signal is then held at "0" level for a predetermined period (e.g., 160 ms), the flag is set at value "2". In the dial detection processing of FIG. 7, the CPU 7 checks in step 501 whether or not a timer flag is set at value "1" or "2". If NO in step 501, the CPU 7 checks in step 502 whether or not "dial output memory=1F" is established. The CPU checks in step 502 if the start address N0 of the dial output memory which is accessed in step 413 is set to be IF or not. If NO in step 502, the CPU 7 causes a counter therein to performs "dial timer→1/timer flag→0" for controlling the dial signal output time. The dial timer is set to be "1", and the timer flag is set to be "0".

Referring to FIG. 8, the CPU 7 performs "dial timer—1" in step 601. In this manner, the count of the dial timer is decremented by one. When the count reaches "0", step 602 for checking "dial timer is stopped" is performed. The CPU 7 then performs "timer task processing" in step 603.

For this purpose, if an initial interrupt routine is executed after the data is written in the dial output memory, steps 501 and 502 are determined to be NO. The CPU 7 performs step 503, and operation in step 602 is determined to be YES in response to the operation in step 601. The flow immediately advances to step 603.

Figure 10:
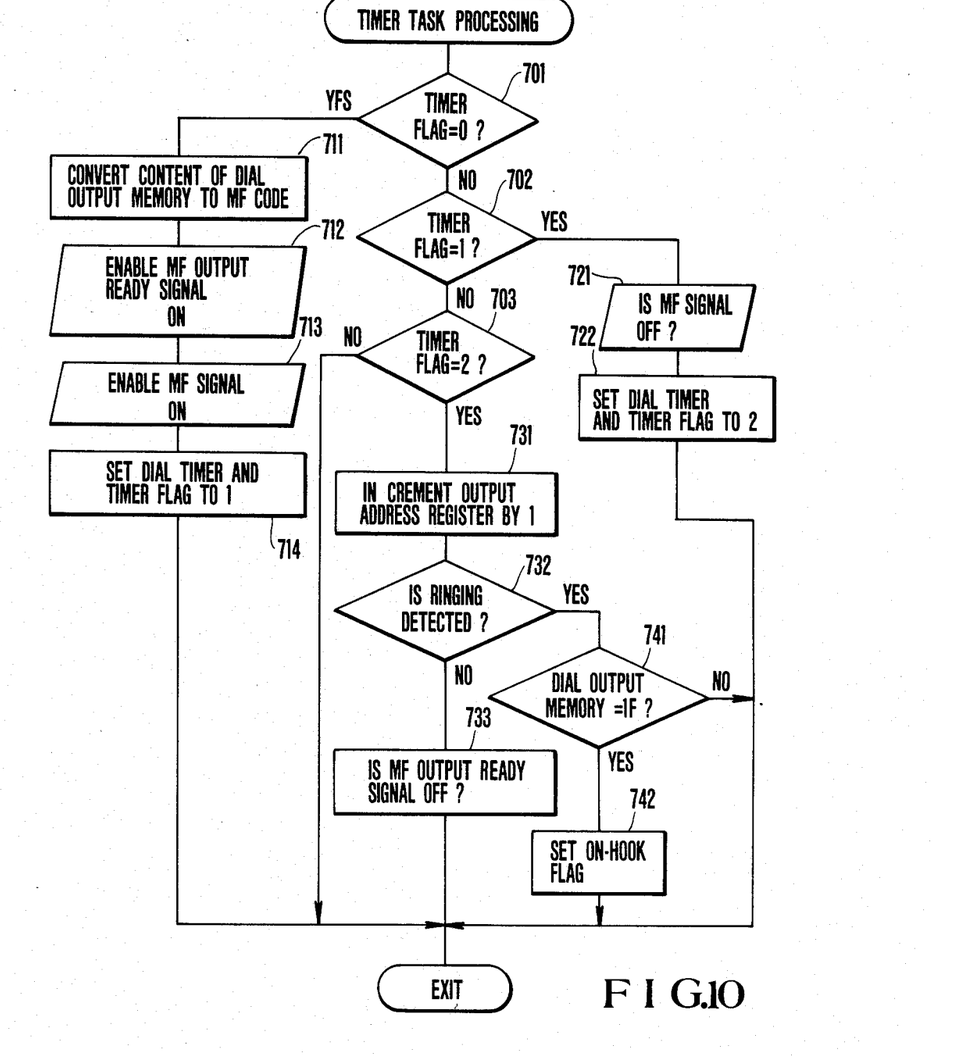
FIG. 10 is a flow chart for explaining the control operation of the CPU.

FIG. 10 is a flow chart of a subroutine of step 603 of FIG. 8. The CPU 7 sequentially performs, in the same manner as in step 501, decision blocks consisting of step 701 of "timer flag=0?", step 702 of "timer flag=1?" and step 703 of "timer flag=2?". However, if the initial interrupt routine is executed after the data is written in the dial output memory, and if step 701 is determined to be YES in response to the operation of step 503, the contents of the dial output memory are converted to an MF code in step 711. More particularly, the data having address number N0 is converted to a code corresponding to X and Y outputs from the matrix-like keyboard 17. The CPU 7 then performs "MF output ready signal ON processing" in step 712. At the same time, the CPU 7 supplies an enable signal to the signal generator 18 and a closed-circuit control signal to the speech circuit 13. The signal generator 18 is enabled and the handset 14 is engaged with the telephone line. The CPU 7 supplies the code converted in step 711 to the signal generator 18. The CPU 7 generates the MF signal representing the start signal (the first digit) in the above table by "MF signal ON processing" in step 713. The CPU 7 then performs "dial timer set/timer flag→1" in step 714, and sets, for example, "40" in the dial timer. At the same time, the timer flag is set to be "1".

For every 4-msec cycle of the interrupt routine, step 501 is determined to be YES. The content, i.e., "40" is sequentially decremented by one in step 601. At the same time, the routine through the "NO" decision of step 602 is repeated. The MF signal transmission state in step 713 is maintained until a period of time, 160 msec=(4 msec×40) has elapsed and the count of the dial timer reaches "0", and step 602 is determined to be YES.

When YES in step 602, step 702 is determined to be YES through the "NO" decision in step 701, as shown in FIG. 10. The CPU 7 then performs "MF signal OFF processing" in step 721 opposite to that of step 713. The MF signal transmission is stopped, and "dial timer set/timer flag→2" is performed in step 722. The CPU 7 then sets "40" again in the dial timer. At the same time, the timer flag is set to be "2".

The routine branching from the YES decision of step 501 and the NO decisions of steps 601 and 602 is repeated for every 4-msec cycle. When 160 msec have elapsed and then step 602 is determined to be YES, step 703 is determined to be YES through the NO decisions of steps 701 and 702 in FIG. 8. The CPU 7 performs "output address register +1" in step 731 in correspondence with step 731. The address number N1 of the dial output memory is designated to increment the contents of the output address register by one.

The CPU 7 checks in step 732 in the same manner as in step 105 of FIG. 2 whether or not an incoming call is made. If NO in step 732, the CPU 7 determines that the incoming call is made by normal dialing. The CPU 7 performs "MF output ready singal OFF processing" in step 733 in a manner opposite to that in step 712 so as to permit a subscriber at the handset 14 to speak. However, when step 732 is determined to be YES, the CPU 7 checks "dial output memory =1F?" in step 741 in the same manner as in step 502. While step 741 is being determined to be NO, the above operation is repeated.

The dial output memory is sequentially addressed for the number after N1 in step 731. At the same time, the MF signal is transmitted in response to the operation in step 713 for every 160 msec defined by steps 714 and 722 and the dial timer operation of step 601. The MF signal is then stopped in response to the operation in step 722, and the address is sequentially updated. The data in the above table are sequentially transmitted as the MF signal for each 160 msec as the mark and space periods.

When the address of the dial output memory is accessed up to N15 and transmission of the alarm information and the control number is completed, step 741 is determined to be YES. Step 103 of FIG. 2 is determined to be YES so as to perform "on-hook flag setting" in step 742. The flow advances to step 131. In step 131, a series of operations are completed, and the system restores the initial wait state after the relay GS is deenergized and the DC loop is disconnected.

In this manner, the maintenance control center decodes and displays the transmitted contents upon reception of the MF signal supplied from the telephone set after ringing operation. Therefore, "no failure" or "failure portion" are displayed together with the control number. Therefore, the maintenance personnel can know the states of the respective telephone sets even if they stay at a remote maintenance control center, as needed.

The dial signal circuitry and its memory are used for transmitting the alarm information in the present invention. The prescribed function can therefore be realized without increasing the number of circuits.

In the above description, an automatic answering telephone function is not provided in the telephone set in principle. However, if the ON/OFF period of the ringing signal is updated, self and ringing check functions are provided, and a self check discriminating function is provided in the telephone set, the automatic answering telephone function can be realized.

When a pulse signal is used as a dial signal, alarm information can be transmitted by the pulsed dial signal or by modulating another speech frequency signal in accordance with a high-speed modulation scheme such as FSK (frequency shift keying). In this case, the arrangement of FIG. 1 is designed in accordance with the conditions described above, and in the flow charts of FIGS. 3 to 8 and 10, steps are reordered or omitted as needed. Alternatively, the steps may be replaced with other equivalent steps. Various other changes and modifications may be made within the spirit and scope of the invention. The coin telephone is powered with the station power source but can be powered with an AC outlet.

As is apparent from the above description, without performing the off-hook operation, the maintenance control center can designate self diagnosis of the telephone set and transmission of the alarm information. Therefore, the telephone set is not left unrepaired to provide better service to the users, thus achieving advances in various types of coin telephones.

What is claimed is:

1. A coin telephone having a self diagnosis function, comprising:
   ringing detecting means, connected to station line terminals, for detecting a ringing signal;
   DC loop forming means for forming a DC loop upon detection of the ringing signal;
   self diagnosis means for starting a self diagnosis operation upon formation of the DC loop; and
   alarm transmission means for transmitting through said station line terminals alarm information corresponding to a content of a failure and a predetermined self control number assigned to said coin telephone when the failure is detected by the self diagnosis operation.

2. A telephone according to claim 1, wherein said self diagnosis means and said alarm transmission means constitute a microcomputer.

3. A telephone according to claim 1, wherein the alarm information and the self control number are stored in a memory in a predetermined order and are then transmitted through said station line terminals.

4. A telephone according to claim 3, wherein said memory comprises a dial output memory for sending a dial signal when an outgoing call is made.

5. A telephone according to claim 4, wherein contents of said dial output memory are sequentially sent through said station line terminals under the control of dial signal generating means.

6. A telephone according to claim 2, wherein said ringing detecting means has a memory for holding a ringing detection signal, and said microcomputer identifies an outgoing or incoming call in accordance with contents of said memory in said ringing detecting means.

7. A telephone according to claim 1, wherein said DC loop forming means has a function for disconnecting said DC loop after said alarm transmission means sends the alarm information and the self control number through said station line terminals.

8. A telephone according to claim 1, further comprising means for inhibiting telephone communication when said DC loop is formed or the failure is detected by the self diagnosis operation.

9. A telephone according to claim 1, wherein said DC loop forming means has means for forming said DC loop in an off-hook operation.

10. A telephone according to claim 1, wherein said ringing detecting means and said DC loop forming means are always applied with a bias voltage, and said self diagnosis means and said alarm transmission means are applied with the bias voltage after said DC loop is formed.

* * * * *